Patented Oct. 16, 1923.

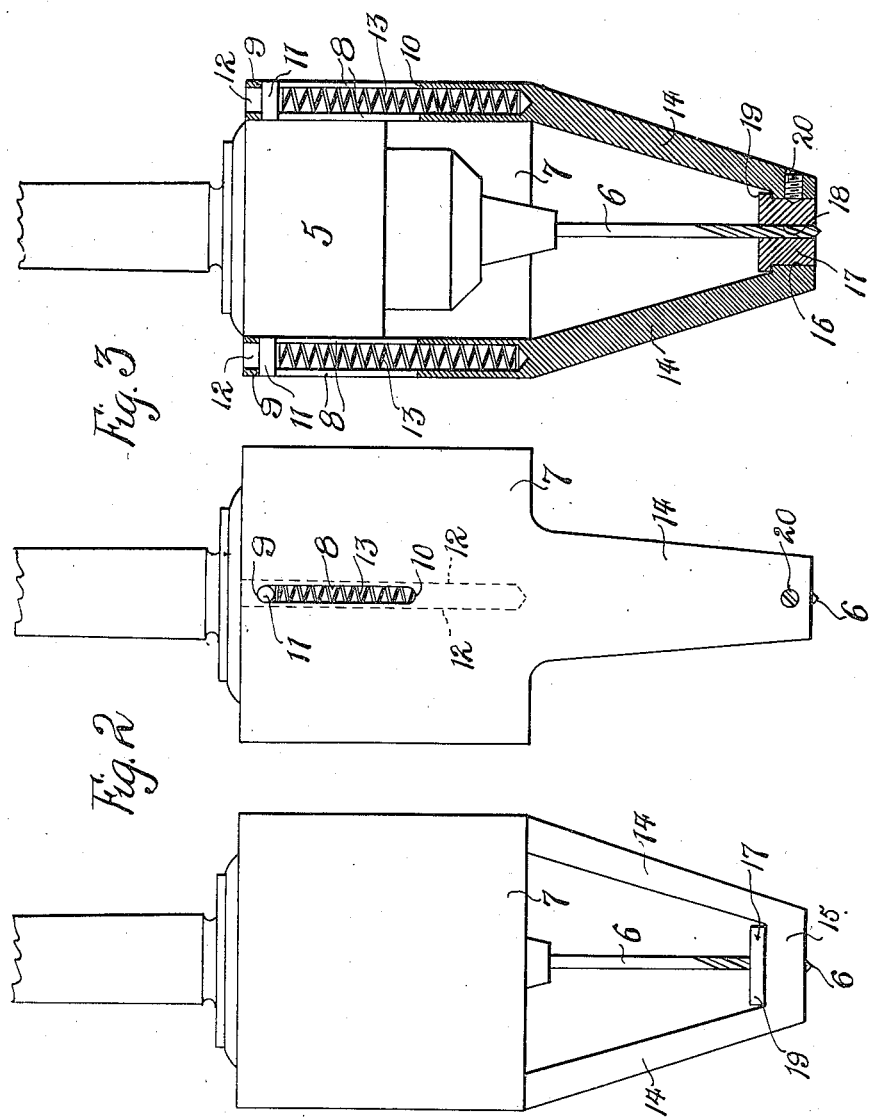

1,471,137

UNITED STATES PATENT OFFICE.

LOUIS G. BOWMAN, OF CHICAGO, ILLINOIS.

DRILL-GUIDE ATTACHMENT FOR CHUCKS.

Application filed March 11, 1921. Serial No. 451,536.

*To all whom it may concern:*

Be it known that I, LOUIS G. BOWMAN, a citizen of the United States, residing at Chicago, in the county of Cook and State of Illinois, have invented certain new and useful Improvements in Drill-Guide Attachments for Chucks, of which the following is a specification.

This invention relates to new and useful improvements in metal working drills and has for its principal object to provide the chuck with a drill guiding attachment whereby the use of jigs will be eliminated.

Another object of the invention is to provide a bushing for guiding the drill which rotates with the drill and thereby prevents the metal chips from frictionally engaging the wall of the opening of the bushing and enlarging the same.

Another object of the invention is to provide a sleeve for supporting the bushing, and to support the sleeve on the drill chuck to rotate therewith and have movements in a plane parallel with the axis of the chuck.

A further object of the invention is to provide a drill attachment of the character described with means for yieldably holding the bushing in spaced relation to the chuck.

In the drawings,

Figure 1 is a front elevation of a chuck showing my improved drill guide attached thereto, Figure 2 is a side elevation thereof, and Figure 3 is a vertical section, the chuck being shown in elevation.

Like reference numerals indicate corresponding parts in the various figures of the drawings.

Referring to the drawings, 5 designates a chuck of usual construction and 6 a drill carried thereby.

A sleeve 7 surrounds the chuck and is provided with diametrically opposed slots 8—8 which extend vertically or in a plane parallel to the axis of the chuck. Each slot is formed with a closed upper end 9 and with a closed lower end 10. Diametrically opposed guide pins 11—11 are fixed to the chuck and extend into the respective slots. The walls of each slot are cut away as at 12—12 to form a seat for a coil spring 13. Each spring is disposed between the corresponding guide pin 11 and the lower end 10 of the slot. Each seat is formed by drilling downwardly from the upper end of the sleeve to a point below the slot. The seats are, therefore, longer than the slots and permit of the springs being readily compressed when the chuck is moved relative to said sleeve. Each seat, thus formed, is circular in cross-section and is slightly larger than the diameter of the spring. Thus the springs are retained against bowing, and are also enclosed.

Integral with the sleeve and depending inwardly therefrom are diametrically opposed arms 14—14, which, at their lower ends, are connected by a support 15 having an opening 16 formed therein for receiving a removable bushing 17 of hardened steel, the bushing being concentrically formed with an opening 18 which constitutes a guide for the drill 6. The bushing is formed with a supporting flange 19, and a set screw 20 threaded into the support 15, serves to lock the bushing against movement relative to the sleeve.

From the foregoing, it will be observed that the sleeve is connected to the chuck by a pin and slot connection which necessitates the sleeve revolving with the chuck yet permitting relative movements between the chuck and sleeve in a plane parallel with the axis of the chuck. Inasmuch as the drill guide or bushing is fixed to its support, it will rotate with the drill and consequently the metal chips will not cut or grind the wall of the opening. Thus the drill will be properly guided and will not wobble during its cutting action. While the drill is rotated and moved downwardly, the sleeve and drill guide rotate with the chuck but do not move downwardly therewith. This movement, however, compresses the springs 13. The drill guide, therefore, always remains on the article being drilled.

It will be seen that the spaced depending arms 14, 14 provide resultant spaces whereby access to the drill may be had for the purpose of attaching or removing the same.

It will also be noted that the lower face of the bushing 17 is normally disposed slightly above the drill point and in a plane at right angles to the longitudinal axis of the drill. This permits stock of various shapes to be drilled. This is especially true in connection with flat stock wherein it is desired to properly support the point of the drill during the drilling operation.

It will also be observed that my invention is in the nature of an attachment for drill chucks now in use and that the only change necessary to secure my improved guide to such a drill chuck is the application of the guide pins 11 thereto.

Another important feature of my invention resides in the fact that this attachment is devoid of any projections extending outwardly from the periphery of the sleeve and consequently all danger of injury to the operator's hand during the rotation of the chuck and attachment is avoided.

What I claim is:

The combination with a rotary chuck, of a drill carried thereby, a sleeve surrounding the chuck and formed with diametrically opposed longitudinally disposed bores extending downwardly from the upper end thereof, the lower ends of the bores forming seats, said sleeve being formed with diametrically opposed slots communicating with said bores, guide pins fixed to the chuck and extending into said slots, coil springs respectively disposed in said bores and arranged between the seats thereof and said pins, and a guide for the drill carried by the sleeve and disposed below the chuck.

In testimony whereof I affix my signature.

LOUIS G. BOWMAN.